Figure 7:
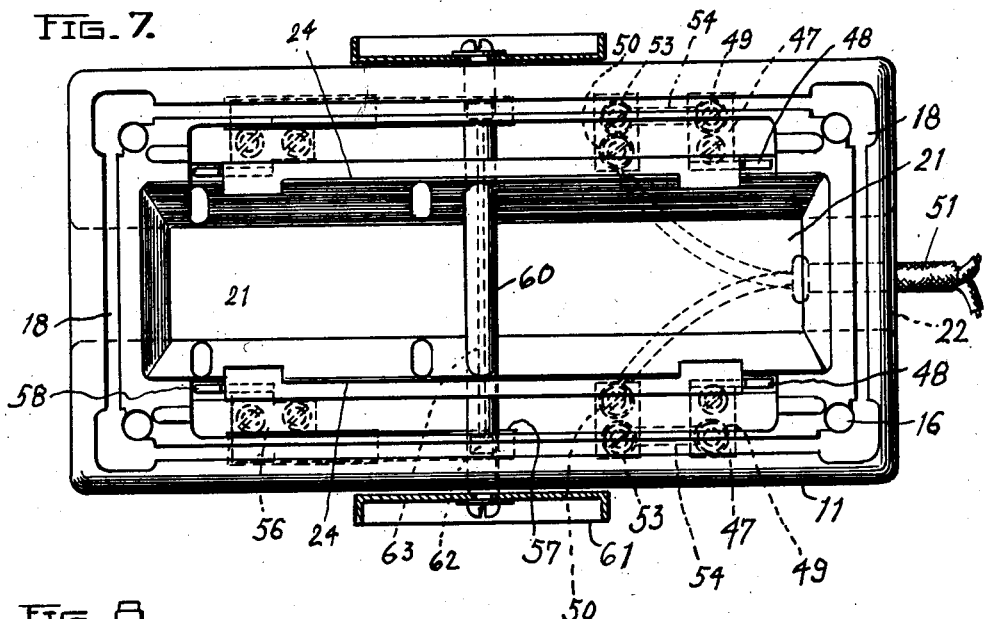

Aug. 17, 1926.
I. E. COLEMAN
1,596,081
ELECTRIC TOASTER
Filed Sept. 1, 1925   3 Sheets-Sheet 1
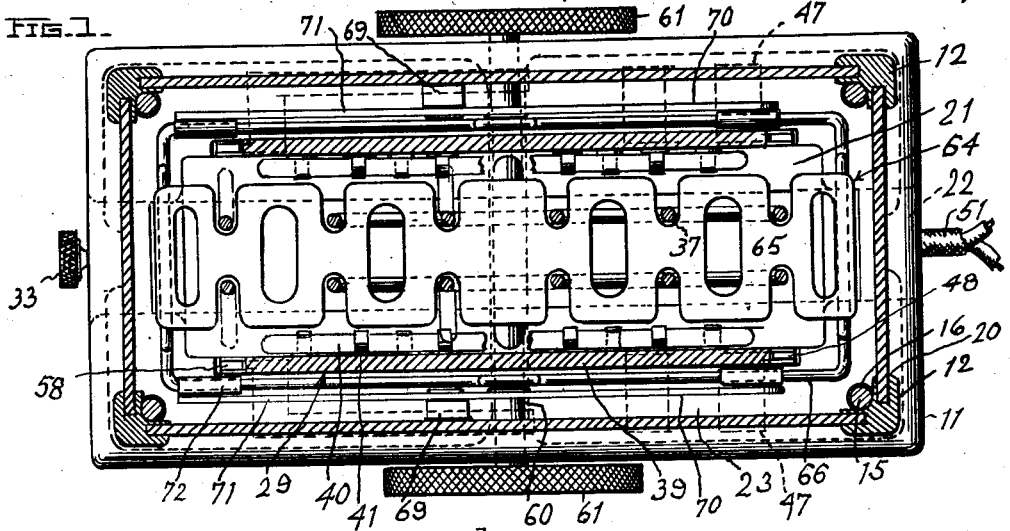
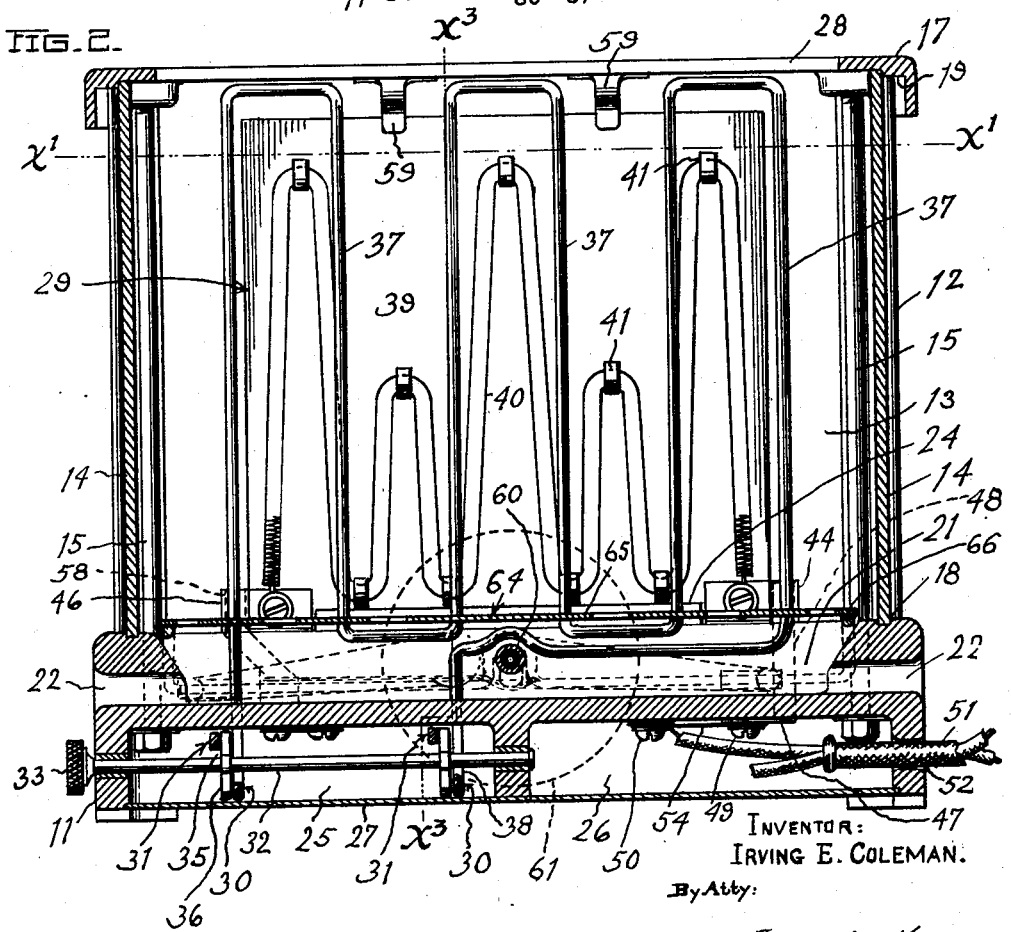
INVENTOR:
IRVING E. COLEMAN.
By Atty:
Frederic M. Keeney.

Aug. 17, 1926.
I. E. COLEMAN
ELECTRIC TOASTER
Filed Sept. 1, 1925     3 Sheets-Sheet 2
1,596,081
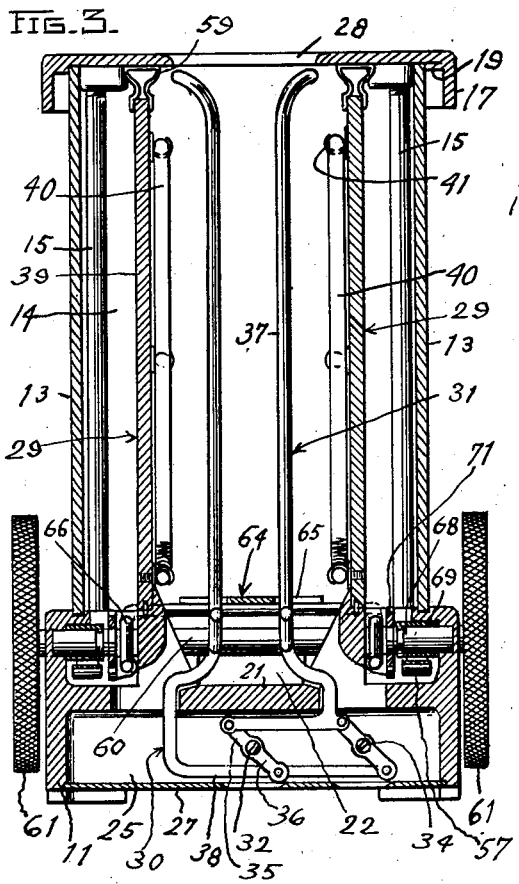
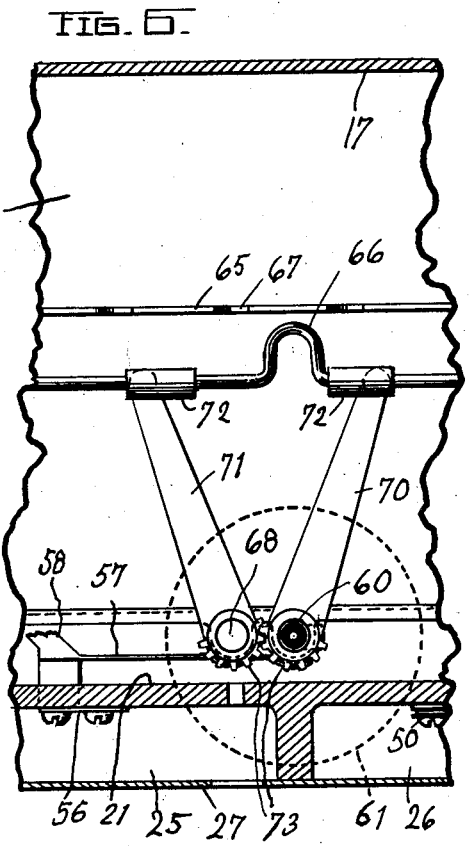
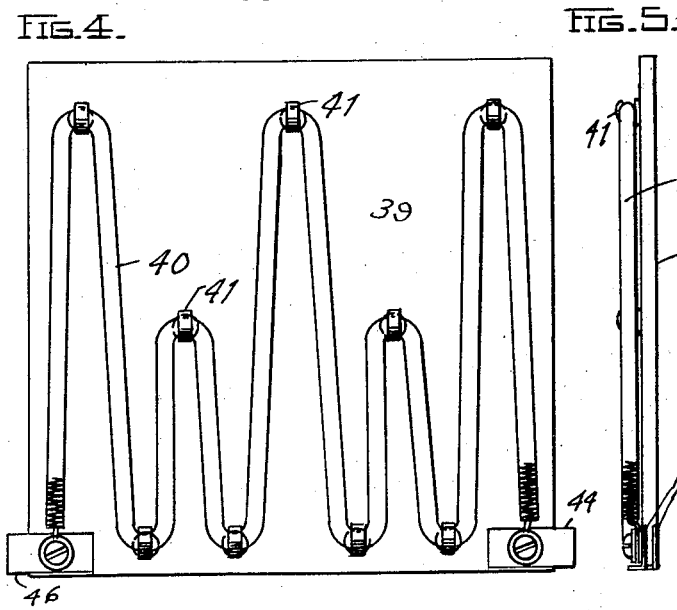
INVENTOR:
IRVING E. COLEMAN.
By Atty:
Frederic M. Keeney.

Aug. 17, 1926.

I. E. COLEMAN

ELECTRIC TOASTER

Filed Sept. 1, 1925

1,596,081

3 Sheets-Sheet 3

INVENTOR:
IRVING E. COLEMAN.
By Atty:

Frederic M. Keeney.

Patented Aug. 17, 1926.

UNITED STATES PATENT OFFICE.

IRVING E. COLEMAN, OF LOS ANGELES, CALIFORNIA.

ELECTRIC TOASTER.

Application filed September 1, 1925. Serial No. 53,875.

The present invention is an improvement on the electric toaster, shown and described in Letters Patent of the United States, No. 1,550,949 granted to me on the 25th day of August, 1925.

It is a design of the invention to provide an oven toaster having separate sides, separate corner members, a separate base member and a separate top, whereby the respective elements may be made from different materials, and from scrap pieces of material as may be convenient.

It is a design of the invention to provide a base member, having all the electric wiring included in the limits thereof, and having all the operative parts attached to the base, and adapted to remain attached to the base when the top and sides are removed.

It is a further design of the invention to provide a toaster in which the toast rack remains within the limits of the oven housing in toast receiving position, and to provide removable heating grids, whereby an unskilled person may readily remove and replace a burned out heating element.

It is a further design of the invention to provide opposed toast holding members whereby the slice to be toasted is supported midway between the grids, so that the slice will be toasted evenly on both sides.

It is a further design of the invention to provide adjustable toast-holding members, whereby the space between them may be adjusted or set in accordance with the thickness of the slice to be toasted, and to provide a mechanism for easy adjustment of the holding members, and mechanism which is independent of the other operative parts of the device, and to provide toast holders which may be forced apart by the insertion of the slice, provided they have not been correctly adjusted before insertion of the slice.

It is a further design of the invention to support the grids in a manner whereby they have sufficient tolerance to prevent warping and cracking under heat, to avoid torsional strains, and to prevent cracking in shipment, to provide a toasting device having fuse elements for protection of the heating elements, and to otherwise protect the operative elements of the device.

While the drawings illustrate the preferred embodiment of my invention, I wish it to be understood that I may change the specific arrangement of the parts and make minor alterations without in any way departing from the spirit and scope of the invention.

Figure 8:
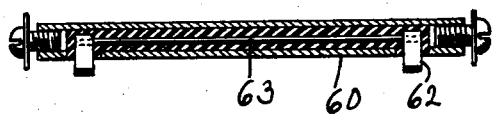
Figure 9:
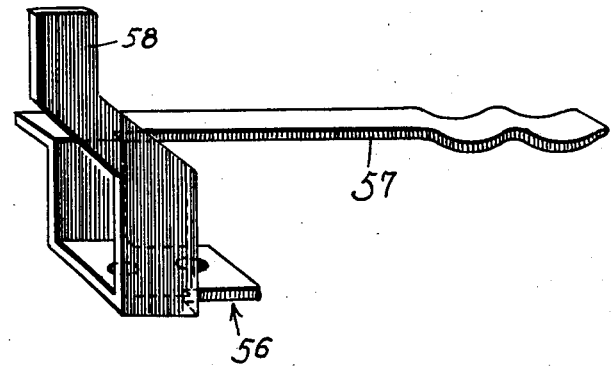

In the drawings, Figure 1 is a sectional and plan view of my improved toaster, taken on the line $X^1-X^1$, of Fig. 2. Fig. 2 is a vertical and longitudinal section of the toaster. Fig. 3 is a transverse and sectional elevation of the toaster taken on line $X^3-X^3$, of Fig. 2. Fig. 4 is a side elevation of a heating grid. Fig. 5 is an end elevation of a heating grid. Fig. 6 is a fragmentary and sectional view of the toaster showing the lifting elements which support the toast carrier. Fig. 7 is a top plan view of the molded base. Fig. 8 is a sectional detail view of the shaft which carries certain of the switch elements. Fig. 9 is a perspective and enlarged detail view of a contact member.

Referring to the drawings, my improved electric toaster consists of an oven having a molded base 11, corner members 12, side walls 13, and end walls 14, secured by draw bolts 15, extending through apertures 16, in the base, and screw connected to the top member 17. Base 11 is provided with a groove 18, adapted to engage with the side walls 13, corner members 12, and end walls 14, in assembled position. The top member 17, has a flange 19, serving to hold the side and end walls in position, and the corner members 12, are provided with grooves 20, to receive the side and end walls. The base 11 has a central recess 21, forimng a crumb tray having openings 22, one at either end, through which the crumbs may be removed. Other recesses 23, extend parallel with the crumb tray. The abutments 24, one on either side of the crumb tray, serve to support the heating grids, to be hereinafter described. The base has a recessed portion 25, in which is mounted the actuating mechanism for the toasting forks, to be hereinafter described, and a recessed portion 26, containing the electric wiring. A cover 27 is provided, which forms the portions 25 and 26 into chambers. The top member 17, has a longitudinal opening 28, in which the slice of bread or article to be toasted, is inserted and positioned between grids 29.

Within the oven, I provide two opposed toast-holding members 30 and 31, which are adjustable for varying thickness of the toast, to properly center the same relative to the heating grids. For adjusting the toast holding members, I provide a shaft 32 journalled in the base and having a knurled knob 33, for manually turning the shaft. A countershaft 34, extends parallel with shaft 32. Each shaft has upwardly projecting lever arms 35, to which the toast holding member 31 is connected, and downwardly projecting lever arms 36, to which the toast holding member 30, is pivotally connected. Each of the toast-holding members consists of a single strand of wire having three upwardly extending loops 37, and having its extremities 38, connected to the actuating lever arms. The arrangement is such that the respective toast-holding members are moved to their innermost and outermost positions by a quarter of a turn of knob 33. The uppermost extremities of loops 37 are bent outwardly adjacent to the top opening 28. It has been found in use, that the average person prefers the toast of a certain thickness. This part of the device, when once set, will therefore serve to support the slices equidistant from the heating grids, and is arranged to be adjusted independently of the remaining operative parts.

The grids 29, consist of plates 39, of an insulating material, and each supporting a heating element 40, consisting of a helical coil of wire, carried by hooks 41, and having its terminals secured to contact members 44 and 46, on the lower corners of plate 39.

The base, preferably molded from a dielectric material, has secured thereto the contact members 47, having contact blades 48 projecting upwardly and into the oven adjacent to the ends of the grid-supporting abutments; the contact members 47 being mounted in chamber 26. Binding posts 49 are mounted on contact members 47. Binding posts 50, are mounted in chamber 26, and connected to the double conductor cable 51, entering the base through aperture 52. Binding posts 53, electrically connected with posts 50, are adjacent to posts 49, and fuse elements 54, connect posts 49 and 53. The contact members 56, having integral spring contact arms 57, and having blades 58 projecting upwardly and into the oven adjacent to the ends of the grid-supporting abutments, are mounted in compartment 25. The grids 29, are detachable, and, when inserted in position, are supported at the top by spring clamps 59, depending from cover 17, and are supported at the bottom, by the engagement of contact members 44, with contact blades 48, and of contact members 46 with contact blades 58.

To energize the heating grids, I provide a switch mechanism for closing a circuit between the spring contact arms 57, consisting of a shaft 60, journalled in the base 11, and having on opposite ends thereof the hand wheels 61. Switch members 62, projecting radially from shaft 60, are adapted to engage with spring contact arms 57 in closed position, and are connected by a wire element 63. Members 62 and connecting element 63, are insulated relative to shaft 60.

The toast rack 64 is positioned between the grids, and is movable to its uppermost or receiving position, and to its lowermost or toasting position, and consists of a plate 65, carried by the wire frame 66. The plate 65 has certain notches 67, through which the toast-holding members 30 and 31, extend. I provide mechanism for actuating the toast rack, consisting of stud shafts 68, journalled in bearings 69, and extending parallel with shaft 60. Shaft 60 has fixed thereto, the lifting levers 70, and shafts 60, have fixed thereto the lifting levers 71. The levers 70 and 71, are pivotally connected, at their outer extremities to crossheads 72, sliding on frame 66. Levers 70 and 71, have intermeshing gear sectors, 73, whereby the levers may be actuated in unison, but through opposed paths of movement. The arrangement is such that the toast rack may be actuated to its uppermost and lowermost positions by a quarter of a turn of the hand wheels 61. The electric switch mechanism is automatically opened as the toast rack approaches its receiving position, and is automatically closed as the toast rack approaches its toasting position. In the receiving position of the toast rack, the toast will project through the opening 28, and may be removed by grasping with the fingers.

What is claimed is:—

1. In an electric toaster, the combination with an oven, having an opening at the top for insertion of a slice of toast, of heating conductors supported in the oven and lying in a vertical plane, a toast holder movable between the heating conductors, means for manually actuating the toast holder in a vertical plane between the heating conductors, and to and from its slice receiving position and its toasting position, toast-holding members disposed in vertical planes between the toast rack and the heating conductors, means for adjusting the toast-holding members to and from each other, and an electric switch interposed between the heating conductors and actuated to a closed position as the toast rack approaches its toasting position, and actuated to an open position as the toast rack approaches its slice-receiving position.

2. In an electric toaster, the combination with an oven having an opening at the top, of heating conductors supported in the oven and lying in vertical planes, a toast rack movable between the heating conductors, means for actuating the toast rack to slice-receiving position and to toasting position, opposed toast-holding members disposed in vertical planes between the toast rack and the heating conductors, means for actuating the toast-holding members to and from each other, electric switch elements interposed between the heating conductors, and mechanism whereby the movement of the toast rack actuates the switch elements.

3. In an electric toaster, the combination with an oven having a slice-receiving opening at the top, and having a molded base, of terminal binding posts mounted in the base, a double conductor cable extending from the base and connected to said terminal binding posts within the base, other binding posts electrically connected with the terminal binding posts, contact members mounted in the base, binding posts on the contact members, fuse elements connecting the binding posts on the contact members and the intermediate binding posts, contact blades integral with the contact members and projecting upwardly into the oven, spring contact members mounted in the opposite end of the base, other contact blades integral with said spring contact members and projecting upwardly within the oven and in opposed relation to the first-named contact blades, detachable grids mounted in the oven and between the said contact blades, contact members on the grids and adapted to engage with the contact blades, heating conductors mounted on the grids and having their terminals connected to the contact members on the grids, a switch shaft journalled in the base and extending transversely therein, switch members projecting radially from the switch shaft and adapted to engage with the spring contact members, an electric conductor in the switch shaft and connecting the switch members, hand wheels on the switch shaft for manually actuating the shaft and switch members through an arc of ninety degrees, to open and close the switch circuit between the heating elements, a toast rack operative between the heating conductors and movable to and from the slice receiving opening at the top, and lifting mechanism for the toast rack actuated by the switch shaft.

4. In an electric toaster, the combination with a base member having a groove in the top and extending adjacent to the sides of the base, of corner housing members adapted to engage with said groove at the corners of the base, said corner members having longitudinal grooves, a top member having an inner flange, side wall and end wall members adapted to engage with the groove in the base and with the longitudinal grooves in the corner members and to abut against the flange in the top member, draw bolts passing through the base and extending upwardly and having a screw connection with the top member, said top member having a longitudinal slice-receiving opening and said base having a depression in opposed relation to the top opening and serving as a crumb tray, heating grids mounted in the housing formed by said base, top member, and wall members, a toast rack operative between the grids, means for actuating the toast rack, and toast-holding members within the housing and on opposite sides of the toast rack, said rack and toast-holding members being independent of the wall members and top member, and operatively mounted on the base.

5. In an electric toaster, the combination with an oven housing having a slice receiving opening at the top, of a toast rack movable within the oven and having an upper receiving position and a lower toasting position, a shaft extending transversely through the housing, hand wheels on said shaft and disposed on opposite sides of the oven housing, a wire frame integral with the toast rack, crossheads slidable on the wire frame, lever arms on said transverse shaft and having a pivotal connection with certain of the crossheads, stud shafts journalled in bearings within the housing, other lever arms integral with the stud shafts and having pivotal connection with the remaining crossheads, intermeshing sector gearing on said lever arms whereby the lever arms swing in opposite directions and in arcuate paths of movement to lift the wire frame and the toast rack, heating grids within the housing and on opposite sides of the toast rack, electric energizing cables entering the housing and having connection with the heating grids, and switch elements having connection with the grids and arranged to be actuated to closed position as the rack approaches its toasting position, and to be actuated to open position as the rack approaches its receiving position.

6. In an electric toaster, an oven housing having detachable side walls and detachable end walls of a suitable material, a base for the oven housing molded from a dielectric material, electrical elements mounted within the base and including energizing cables, contact blades fixed to the base and projecting upwardly into the oven, spring switch elements in connection with two of said contact blades, said energizing cables being in connection with the two remaining contact blades, grid plates detachably mounted within the housing, contact members on the grid plates in connection with said contact blades, a resistance conductor mounted on each grid plate and having its terminals in connection with the respective contact members on the grid plate, a switch shaft extending transversely through the base, switch members projecting radially from said switch shaft and adapted to engage with the spring switch elements, and to be disengaged by a quarter of a turn of the shaft, hand wheels on said shaft and arranged externally relative to the housing, slice-holders mounted within the oven housing and movable to and from each other and arranged to support a slice of toast between the grid plates, means for independently adjusting the slice holders to a predetermined spaced apart position, a toast rack working between the slice-holders, and movable to its receiving position and to its toasting position, stud shafts journalled in the base and adjacent to the switch shaft, lever arms integral with the stud shafts and with the switch shaft, and a wire frame integral with the toast rack, crossheads sliding on the wire frame, said arms on said shafts having pivotal connection with the crossheads, said lever arms being arranged to lift the rack to receiving position as the switch elements are disengaged, and to toasting position as the switch elements are moved to engaged position.

7. In an electric toaster, the combination with a base member molded from dielectric material, of heating grids mounted on and projecting upwardly in vertical planes from the base, electric energizing elements mounted in the base and in connection with the grids, switch elements between the heating elements, and mounted in the base, and arranged to open and to close the energizing circuit, toast-holders projecting upwardly from the base, means for actuating the toast holders mounted within the base, a shaft for the toast holder actuating means projecting from the base, a knob on said shaft, a toast rack disposed between the grids and working in a vertical plane, means for actuating the switch elements to open and closed position disposed in the base, means whereby the switch actuating elements actuate the toast rack to a receiving position as the switch elements are moved to open position, and actuate the toast rack to a toasting position as the switch elements are moved to a closed position, said actuating means including a switch shaft extending transversely in the base and hand wheels on opposite ends of the switch shaft, all of said operative elements being connected to the base, and independent and detachable side wall members, end wall members, and top member mounted on the base and independent of the operative parts.

8. In an electric toaster, a base member, operative parts mounted on the base member and including a toast rack, means for actuating the rack upwardly and downwardly, toast holding members, means for actuating the toast holding members laterally to and from the rack, heating elements, a switch for the heating elements, and means for actuating the switch elements to open and closed positions, and an oven enclosing wall and top members mounted on the base.

9. In an electric toaster, the combination with an electric oven, and a molded base for the oven, of toast-lifting elements mounted within the oven, mechanism for the lifting elements mounted in the base, toast-holding elements mounted in the oven, mechanism for moving the holding elements to and from each other located in the base, and adapted to be actuated independently of the lifting mechanism, heating elements within the oven and adjacent to the holding and lifting elements, electrical elements within the base and in connection with the heating elements, switch elements within the base and arranged to open and to close a circuit for the electrical elements and heating elements, and mechanism whereby the switch elements are actuated cooperatively with the lifting elements.

10. The combination with heating means, of toast-holding means adjacent thereto, a toast rack interposed between the toast-holding means, and between the heating means, and having a receiving position and a toasting position, means whereby the switch elements are actuated to closed position as the rack approaches its toasting position, and to an open position as the rack approaches its receiving position, and housing members enclosing the holding and toast-lifting members and heating elements, detachably secured to the base.

11. The combination with toast-holding means and toast-lifting means, of means for independently actuating the holding and lifting means, heating means associated with the holding means, means for energizing the heating means, switch elements adapted to control the energizing means, and means whereby the switch elements are actuated simultaneously with the movement of the lifting means and actuated to closed position as the lifting means approach their lowermost position and to open position as the lifting means approach their uppermost position.

In testimony whereof, I hereunto affix my signature.

IRVING E. COLEMAN.